US010833369B2

(12) United States Patent
Maeda et al.

(10) Patent No.: US 10,833,369 B2
(45) Date of Patent: Nov. 10, 2020

(54) POSITIVE ELECTRODE ACTIVE SUBSTANCE FOR LITHIUM SECONDARY BATTERY, POSITIVE ELECTRODE FOR LITHIUM SECONDARY BATTERY AND LITHIUM SECONDARY BATTERY, AND METHODS FOR PRODUCING THESE (71) Applicant: NEC CORPORATION, Tokyo (JP)

(72) Inventors: Katsumi Maeda, Tokyo (JP); Sadanori Hattori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 91 days.

(21) Appl. No.: 15/778,905

(22) PCT Filed: Oct. 31, 2016

(86) PCT No.: PCT/JP2016/082195
§ 371 (c)(1),
(2) Date: May 24, 2018

(87) PCT Pub. No.: WO2017/094416
PCT Pub. Date: Jun. 8, 2017

(65) Prior Publication Data
US 2018/0351199 A1 Dec. 6, 2018

(30) Foreign Application Priority Data

Dec. 2, 2015 (JP) .................................. 2015-235932

(51) Int. Cl.
*H01M 10/058* (2010.01)
*H01M 4/505* (2010.01)
*H01M 4/525* (2010.01)
*H01M 10/0569* (2010.01)
*H01M 4/58* (2010.01)
*H01M 10/0585* (2010.01)
*H01M 4/36* (2006.01)
*H01M 4/38* (2006.01)
*H01M 4/583* (2010.01)
*H01M 4/66* (2006.01)
*H01M 10/0525* (2010.01)
*H01M 4/02* (2006.01)

(52) U.S. Cl.
CPC ......... *H01M 10/058* (2013.01); *H01M 4/366* (2013.01); *H01M 4/386* (2013.01); *H01M 4/505* (2013.01); *H01M 4/525* (2013.01); *H01M 4/58* (2013.01); *H01M 4/583* (2013.01); *H01M 4/661* (2013.01); *H01M 10/0525* (2013.01); *H01M 10/0569* (2013.01); *H01M 10/0585* (2013.01); *H01M 2004/027* (2013.01); *H01M 2004/028* (2013.01); *Y02E 60/122* (2013.01); *Y02T 10/7011* (2013.01)

(58) Field of Classification Search
CPC ...... H01M 4/366; H01M 4/386; H01M 4/505; H01M 4/525; H01M 4/58; H01M 4/583; H01M 4/661; H01M 10/0525; H01M 10/0569; H01M 10/058; H01M 10/0585; H01M 2004/027; H01M 2004/028; Y02E 60/122; Y02T 10/7011
See application file for complete search history.

(56) References Cited

U.S. PATENT DOCUMENTS

| | | | | |
|---|---|---|---|---|
| 2006/0071198 A1* | 4/2006 | Paulsen | ............... | C01G 45/1228 252/500 |
| 2006/0233696 A1* | 10/2006 | Paulsen | ................ | C01G 53/006 423/594.4 |
| 2010/0247986 A1* | 9/2010 | Toyama | ................ | H01M 4/366 429/61 |
| 2012/0034503 A1* | 2/2012 | Toyama | ................ | H01M 4/131 429/91 |
| 2015/0024280 A1* | 1/2015 | Uchiyama | ............. | H01M 4/366 429/304 |

FOREIGN PATENT DOCUMENTS

| | | |
|---|---|---|
| JP | 11-273674 A | 10/1999 |
| JP | 2002-358959 A | 12/2002 |
| JP | 2010-040382 A | 2/2010 |
| JP | 2010-232001 A | 10/2010 |
| JP | 2011-014379 A | 1/2011 |
| JP | 2012-505520 A | 3/2012 |
| JP | 2013-152825 A | 8/2013 |
| JP | 2013-254605 A | 12/2013 |
| JP | 2014-022276 A | 2/2014 |
| JP | 2014-026950 A | 2/2014 |
| JP | 2015-015169 A | 1/2015 |
| WO | 2012/141301 A1 | 10/2012 |

OTHER PUBLICATIONS

Sheng Shui Zhang, "A review on electrolyte additives for lithium-ion batteries", Journal of Power Sources, 2006, pp. 1379-1394, vol. 162.

(Continued)

Primary Examiner — Anca Eoff
(74) Attorney, Agent, or Firm — Sughrue Mion, PLLC (57) ABSTRACT An object of the present invention is to provide a positive electrode active substance capable of suppressing gas generation associated with charge and discharge in a lithium secondary battery, and capable of suppressing gas generation associated with charge and discharge particularly even in cases where the use voltage of the lithium secondary battery is high, a positive electrode and a lithium secondary battery using the positive electrode active substance, and methods for producing these. The present invention is a positive electrode active substance for a lithium secondary battery, comprising a coated positive electrode active substance wherein a surface of a positive electrode active substance is directly coated with lithium metaphosphate.

20 Claims, 1 Drawing Sheet

(56) References Cited

OTHER PUBLICATIONS

International Search Report of PCT/JP2016/082195 dated Jan. 31, 2017 [PCT/ISA/210].

* cited by examiner

POSITIVE ELECTRODE ACTIVE SUBSTANCE FOR LITHIUM SECONDARY BATTERY, POSITIVE ELECTRODE FOR LITHIUM SECONDARY BATTERY AND LITHIUM SECONDARY BATTERY, AND METHODS FOR PRODUCING THESE

CROSS REFERENCE TO RELATED APPLICATIONS

This application is a National Stage of International Application No. PCT/JP2016/082195, filed Oct. 31, 2016, claiming priority based on Japanese Patent Application No. 2015-235932, filed Dec. 2, 2015, the contents of all of which are incorporated herein by reference in their entirety.

TECHNICAL FIELD

The present invention relates to a positive electrode active substance for a lithium secondary battery, a positive electrode for a lithium secondary battery and a lithium secondary battery, and methods for producing these.

BACKGROUND ART

Lithium secondary batteries are, due to advantages of high energy density, low self-discharge, excellent long-term reliability and the like, utilized as batteries for small-size electronic devices such as laptop computers and cell phones, and the like. Further in recent years, there have advanced the applications of lithium secondary batteries to uses in storage batteries for electric cars and households and power storage applications.

In usual lithium secondary batteries, a positive electrode and a negative electrode in which respective active substance layers containing a positive electrode active substance or a negative electrode active substance are formed on current collectors, respectively, are made to face each other and laminated through a separator; as required, a laminate having a plurality of the electrode pairs are made; and these electrodes are impregnated with a nonaqueous electrolyte solution.

As positive electrode active substances of such lithium secondary batteries, in order to achieve high-energy density lithium secondary batteries, there are disclosed a lithium metal composite oxide having a layered rock salt structure represented by $Li_{1.19}Mn_{0.52}Fe_{0.22}O_{1.98}$ (Patent Literature 1) and a lithium metal composite oxide represented by $LiNi_{0.5}Mn_{1.5}O_4$ (Patent Literature 2).

In such lithium secondary batteries, upon charge and discharge, the reductive decomposition of an electrolyte solution solvent occurs on the negative electrode surface, the oxidative decomposition of the electrolyte solution solvent occurs on the positive electrode surface, and the decomposition products deposit on the electrode surfaces and increase the resistance, and in some cases, gases generated by the decomposition of the solvent make the batteries swell. As a result, there arises the problem of a decrease in battery characteristics due to a decrease in storage characteristics of the batteries and a decrease in cycle characteristics thereof.

In order to avoid such a problem, it is known that compounds having a protective film-forming function, such as vinylene carbonate, fluoroethylene carbonate and maleic anhydride, are added to an electrolyte solution; these compounds are intentionally decomposed at the initial charge time; and the decomposed substances form a protective film, SEI (Solid Electrolyte Interface), on the electrode surface to thereby suppress the decomposition of the solvent (Non Patent Literature 1).

Although these additives form SEI on the negative electrode surface, however, there is not attained a sufficient effect on suppression of gas generation due to oxidative decomposition of the solvent on the positive electrode.

Particularly high-potential lithium secondary batteries using a positive electrode active substance having a potential of 4.5 V or higher as seen in the above battery become more liable to cause gas generation due to oxidative decomposition of the solvent on the positive electrode than usual lithium secondary batteries having a voltage of 3.5 to 4.2 V.

There are disclosed a method, as a method of forming a protective film on the positive electrode active substance surface and thereby suppressing gas generation from the positive electrode, in which the positive electrode active substance is coated with a silane coupling agent and an epoxy resin (Patent Literature 3), and a method in which a boric acid compound is attached (Patent Literature 4). However, a problem thereof is that these positive electrode protective films, in lithium secondary batteries using a high potential positive electrode of 4.5 V or higher, cannot suppress the decomposition of the electrolyte solution on the positive electrodes associated with charge and discharge, and cannot sufficiently suppress gas generation.

There is disclosed also a method in which the incorporation of various phosphorus compounds (lithium phosphate, lithium metaphosphate, cobalt phosphate or cobalt phosphite) to the positive electrode, if a battery is stored at a high temperature in a charged state, suppresses decomposition and gasification caused by a reaction of a lithium nickel composite oxide with an organic electrolyte solution and a resulting rise in the internal pressure of the battery (Patent Literature 5). Specifically, the positive electrode is fabricated by adding the various phosphorus compounds to a positive electrode slurry composed of a positive electrode active substance, a conductive auxiliary agent, a binder and a solvent, and used for the lithium ion battery. However, the method of incorporating a phosphorus compound (adding to the positive electrode slurry), has the following problem: in the lithium ion secondary battery using the high-potential positive electrode of 4.5 V or higher, the method cannot suppress decomposition of an electrolyte solution on the positive electrode associated with charge and discharge, and cannot sufficiently suppress gas generation and moreover causes a decrease in the initial capacity.

Then, Patent Literature 5 discloses a positive electrode material for a lithium secondary battery characterized in that the surface of a lithium transition metal composite oxide containing at least Mn as a transition metal has a metal fluoride and a lithium phosphate compound. Further as an object, it is disclosed to provide a lithium secondary battery excellent in high-temperature cycle characteristics, which uses, as its positive electrode material, a surface-coated lithium manganese composite oxide capable of stably suppressing Mn elution even at a high temperature and at a high voltage without reducing conductivity. Also in this secondary battery, however, gas generation cannot sufficiently be suppressed.

CITATION LIST

Patent Literature

Patent Literature 1: JP2013-254605A
Patent Literature 2: WO2012/141301

Patent Literature 3: JP2014-22276A
Patent Literature 4: JP2010-40382A
Patent Literature 5: JP11-273674A
Patent Literature 6: JP2010-232001A Non Patent Literature Non Patent Literature 1: Journal. Power Sources, No. 162, Vol. 2, pp. 1379-1394(2006)

SUMMARY OF INVENTION

Technical Problem

An object of the present invention is to provide a positive electrode active substance capable of suppressing gas generation associated with charge and discharge in a lithium secondary battery, particularly in cases where the use voltage of the lithium secondary battery is high, capable of suppressing gas generation associated with charge and discharge, a positive electrode and a lithium secondary battery using the positive electrode active substance, and methods for producing these.

Solution to Problem

A positive electrode active substance for a lithium secondary battery according to one aspect of the present invention comprises a coated positive electrode active substance wherein a surface of a positive electrode active substance is directly coated with lithium metaphosphate.

Further a positive electrode for a lithium secondary battery according to another aspect of the present invention comprises a positive electrode current collector, and a positive electrode active substance layer comprising the above positive electrode active substance for a lithium secondary battery on the positive electrode current collector.

Further a lithium secondary battery according to another aspect of the present invention comprises the above positive electrode for a lithium secondary battery, a negative electrode comprising a negative electrode active substance, a nonaqueous electrolyte solution, and an outer package accommodating these.

Further a method for producing a positive electrode active substance for a lithium secondary battery according to another aspect of the present invention is a method for producing the above positive electrode active substance for a lithium secondary battery, the method comprising:
soaking the positive electrode active substance in a coating-forming liquid comprising lithium metaphosphate;
separating and removing the coating film-forming liquid; and
washing the positive electrode active substance after the soaking with a solvent to dissolve lithium metaphosphate.

Further a method for producing a lithium secondary battery according to another aspect of the present invention comprises: forming a coated positive electrode active substance by the above method; forming a positive electrode by using the coated positive electrode active substance; forming a negative electrode; and accommodating the positive electrode, the negative electrode, and an electrolyte solution in an outer package.

Advantageous Effects of Invention

According to exemplary embodiments of the present invention, there can be provided a positive electrode active substance capable of suppressing oxidative decomposition of a solvent on a positive electrode and capable of suppressing gas generation, even in cases where the use voltage of a lithium secondary battery is set at a high potential, and a positive electrode and a lithium secondary battery using the positive electrode active substance, and methods for producing these.

DESCRIPTION OF EMBODIMENTS

[Positive Electrode Active Substance for a Lithium Secondary Battery]

A positive electrode active substance for a lithium secondary battery according to an exemplary embodiment comprises a coated positive electrode active substance being a positive electrode active substance having a surface directly coated with lithium metaphosphate. From the viewpoint of attaining a sufficient coating effect by lithium metaphosphate, it is preferable that the whole surface of a positive electrode active substance be directly coated with lithium metaphosphate in an enough ratio to the positive electrode active substance. Lithium metaphosphate forms bonds, not dissociating by washing with water, with the positive electrode active substance surface, and can form a stable coating over the whole of the positive electrode active substance surface.

The positive electrode active substance is not especially limited as long as being one to be usually used as positive electrode active substances, but is preferably one having an operating voltage of 4.2 V or higher. The positive electrode active substance having a BET specific surface area of 0.5 to 30 m$^2$/g can be used, and preferably, one having that of 1 to 20 m$^2$/g can be used.

The positive electrode active substance specifically suitably includes lithium transition metal oxides such as $LiMnO_2$, $Li_xMn_2O_4$ (0<x<2) such as $LiMn_2O_4$, $LiCoO_2$ and $LiNiO_2$, lithium transition metal composite oxides, being oxides of lithium and two or more transition metals, such as $LiCo_{1-x}Ni_xO_2$ (0.01<x<1), $LiNi_xCo_yMn_zO_2$ (x+y+z=1, 0.01<x, 0.01<y, 0.01<z) and $LiNi_\beta Co_\gamma Al_\delta O_2$ ($\beta+\gamma+\delta=1$, $0.70 \leq \beta <1$, $0<\gamma \leq 0.2$, $0<\delta \leq 80.1$), and phosphoric acid compounds having an olivine structure, such as $LiFePO_4$. These can be used singly or in combinations of two or more.

Among these, the positive electrode active substance usable for a lithium secondary battery having a use voltage of 4.5 V or higher includes excess-lithium transition metal composite oxides in which in lithium transition metal composite oxides, Li is made excessive to stoichiometric compositions.

Such excess-lithium transition metal composite oxides include:
$Li_{1+a}Ni_xMn_yO_2$ (0<a≤0.5, 0<x<1, 0<y<1),
$Li_{1+a}Ni_xMn_yM_zO_2$ (0<a≤0.5, 0<x<1, 0<y<1, 0<z<1, and M is Co or Fe), and
$Li_\alpha Ni_\beta Co_\gamma Al_\delta O_2$ (1<α≤1.2, $\beta+\gamma+\delta=1$, $0.7 \leq \beta <1$, $0<\gamma \leq 0.2$, $0<\delta \leq 0.1$).

The lithium transition metal composite oxide further includes ones comprising a plurality of kinds of transition metals such as cobalt, manganese and nickel, and lithium; and particularly ones having a spinel structure such as LiNi$_{0.5}$Mn$_{1.5}$O$_4$ have an operating voltage of 4.8 V or higher, and can suitably be used.

Further in order to improve cycle characteristics and safety, and enable the use at a high charge potential, also a lithium transition metal composite oxide being obtained by replacing a part of the lithium transition metal composite oxide by other elements can also be used for high-potential lithium secondary batteries. There can be used, for example, a lithium transition metal composite oxide being obtained by replacing a part of at least one element of cobalt, manganese and nickel constituting the lithium transition metal composite oxide by at least one or more elements of Sn, Mg, Ti, Fe, Al, Zr, Cr, V, Ga, Ge, Sm, Zn, Cu, Bi, Mo, La and the like, a lithium transition metal composite oxide being obtained by replacing a part of oxygen atoms of the lithium transition metal composite oxide is by S or F, or a positive electrode in which the positive electrode surface is coated with an oxide containing these elements (SnO, MgO, TiO$_2$, Al$_2$O$_3$, ZrO, V$_2$O$_5$, Ga$_2$O$_3$, GeO$_2$, Sm$_2$O$_3$, ZnO, MoO$_3$, La$_2$O$_3$) or the like.

Specific examples of these lithium transition metal composite oxides include LiCo$_{0.8}$Ni$_{0.2}$O$_2$, LiNi$_{1/2}$Mn$_{3/2}$O$_4$, LiNi$_{1/3}$Co$_{1/3}$Mn$_{1/3}$O$_2$, LiNi$_{0.4}$CO$_{0.3}$Mn$_{0.3}$O$_2$ (abbreviated to NCM433), LiNi$_{0.5}$Co$_{0.2}$Mn$_{0.3}$O$_2$ (abbreviated to NCM523), LiNi$_{0.5}$Co$_{0.3}$Mn$_{0.2}$O$_2$ (abbreviated to NCM532), LiNi$_{0.8}$Co$_{0.15}$Al$_{0.05}$O$_2$, LiNi$_{0.8}$Co$_{0.1}$Mn$_{0.1}$O$_2$, Li$_{1.2}$Mn$_{0.4}$Ni$_{0.4}$O$_2$, Li$_{1.2}$Mn$_{0.6}$Ni$_{0.2}$O$_2$, Li$_{1.19}$Mn$_{0.52}$Fe$_{0.22}$O$_{1.98}$, Li$_{1.21}$Mn$_{0.46}$Fe$_{0.15}$Ni$_{0.15}$O$_2$, LiMn$_{1.5}$Ni$_{0.5}$O$_4$, Li$_{1.2}$Mn$_{0.4}$Fe$_{0.4}$O$_2$, Li$_{1.21}$Mn$_{0.4}$Fe$_{0.2}$Ni$_{0.2}$O$_2$, Li$_{1.26}$Mn$_{0.37}$Ni$_{0.22}$Ti$_{0.15}$O$_2$, LiMn$_{1.37}$Ni$_{0.5}$Ti$_{0.13}$O$_{4.0}$, Li$_{1.2}$Mn$_{0.56}$Ni$_{0.17}$Co$_{0.07}$O$_2$, Li$_{1.2}$Mn$_{0.54}$Ni$_{0.13}$Co$_{0.13}$O$_2$, Li$_{1.2}$Mn$_{0.56}$Ni$_{0.17}$Co$_{0.07}$O$_2$, Li$_{1.2}$Mn$_{0.54}$Ni$_{0.13}$Co$_{0.13}$O$_2$, LiNi$_{0.8}$Co$_{0.15}$Al$_{0.05}$O$_2$, LiNi$_{0.5}$Mn$_{1.48}$Al$_{0.02}$O$_4$, LiNi$_{0.5}$Mn$_{1.45}$Al$_{0.05}$O$_{3.9}$F$_{0.05}$, LiNi$_{0.4}$Co$_{0.2}$Mn$_{1.25}$Ti$_{0.15}$O$_4$, Li$_{1.23}$Fe$_{0.15}$Ni$_{0.15}$Mn$_{0.46}$O$_2$, Li$_{1.26}$Fe$_{0.11}$Ni$_{0.11}$Mn$_{0.52}$O$_2$, Li$_{1.2}$Fe$_{0.20}$Ni$_{0.20}$Mn$_{0.40}$O$_2$, Li$_{1.29}$Fe$_{0.07}$Ni$_{0.14}$Mn$_{0.57}$O$_2$, Li$_{1.26}$Fe$_{0.22}$Mn$_{0.37}$Ti$_{0.15}$O$_2$, Li$_{1.29}$Fe$_{0.07}$Ni$_{0.07}$Mn$_{0.57}$O$_{2.8}$, Li$_{1.30}$Fe$_{0.04}$Ni$_{0.07}$Mn$_{0.61}$O$_2$, Li$_{1.2}$Ni$_{0.18}$Mn$_{0.54}$Co$_{0.08}$O$_2$, Li$_{1.23}$Fe$_{0.03}$Ni$_{0.03}$Mn$_{0.58}$O$_2$.

These can be used singly or in combinations of two or more. Specifically, the lithium transition metal composite oxide can be used, for example, by mixing NCM532 or NCM523 with NCM433 in the range of 9:1 to 1:9 (in mass ratio), for example, in 2:1 (in mass ratio).

Further a lithium transition metal composite oxide represented by the following formula (1) can be used. A battery having a high capacity and a high thermal stability can also be constituted, for example, by mixing a compound in which the content of Ni is high where x is 0.4 or lower in the formula (1) with a compound in which the content of Ni does not exceed 0.5 (for example, NCM433, whose x is 0.5 or higher).

$$Li_yNi_{(1-x)}M_xO_2 \qquad (1)$$

wherein 0≤x<1, 0<y≤1.2; M is at least one element selected from the group consisting of Co, Al, Mn, Fe, Ti and B.

[Coated Positive Electrode Active Substance]

The coated positive electrode active substance contained in the positive electrode active substance for a lithium secondary battery according to the exemplary embodiment is the positive electrode active substance having a surface directly coated with lithium metaphosphate. The lithium metaphosphate is a substance represented directly or approximately by (LiPO$_3$)$_n$ (n is a repeating number of the LiPO$_3$ unit, and can be an integer of 3 or more), and includes lithium salts of cyclophosphoric acids (for example, lithium salts of metaphosphoric acids having a value of n of 3 to 6), and lithium salts of polyphosphoric acids. The lithium metaphosphate can include one or two or more lithium salts of metaphosphoric acids. Here, lithium salts of polyphosphoric acids are salts containing an ion represented by [O$_3$P—(OPO$_2$)$_m$—OPO$_3$]$^{(m+2)-}$ (m is an integer of 1 or more) and lithium ions, and the larger the value of m, the more the lithium salt approaches (LiPO$_3$)$_n$.

Although details of the chemical reaction and the like when the positive electrode active substance is coated with the lithium metaphosphate are unclear, it is conceivable that on the positive electrode active substance surface, the lithium metaphosphate reacts with hydroxyl groups present on the positive electrode active substance surface as indicated by the formula (2) (n in the formula denotes a repeating number of the LiPO$_3$ unit; and M$^{n+}$ denotes a metal ion, and n+ denotes its valence), and thereby, the residue part of metaphosphoric acid (a part of lithium metaphosphate from which the lithium ions have been removed) chemically binds to the positive electrode active substance surface. It is conceivable that for example, as indicated by the formula (2), the phosphorus atoms (P) of the residue part of metaphosphoric acid and a metal ion (M$^{n+}$) of the positive electrode active substance are bound through oxygen atoms (O).

[Formula 1]

In a lithium secondary battery using a positive electrode active substance (coated positive electrode active substance) whose surface is thus coated with lithium metaphosphate, as compared with a lithium secondary battery using a positive electrode fabricated by simply mixing a positive electrode slurry with lithium metaphosphate, since the chemical reaction and decomposition of an electrolyte solution on the surface of the positive electrode active substance associated with charge and discharge are suppressed, the gas generation from the positive electrode is suppressed, and further a lithium secondary battery (lithium ion secondary battery) having a large capacity can be obtained. Further since the positive electrode active substance surface is coated with lithium metaphosphate, the following effect can be obtained: the lithium secondary battery (lithium ion secondary battery) has stability over a long period, elongating the life. Consequently, a lithium ion secondary battery large in the capacity, high in the energy density and excellent in the stability in charge and discharge cycles can be obtained.

In such a coated positive electrode active substance formed by using lithium metaphosphate, the amount of lithium metaphosphate A used for coating the surface of the positive electrode active substance is, with respect to the amount of the positive electrode active substance B before coating, in mass ratio (A/B), preferably 0.0005 to 0.15, and more preferably 0.001 to 0.10. From the viewpoint of as little as possible impairing original properties of the positive electrode active substance and attaining a sufficient coating effect, the mass ratio is preferably in the above range.

The density of the positive electrode active substance layer comprising the coated positive electrode active substance and formed on a positive electrode current collector is preferably 1.0 g/cm$^3$ or higher and 3.0 g/cm$^3$ or lower. When the density of the positive electrode active substance layer is 1.0 g/cm$^3$ or higher, lowering of the absolute value of the discharge capacity can be suppressed. On the other hand, when the density of the positive electrode active substance layer is 3.0 g/cm$^3$ or lower, the electrolyte solution is easily impregnated into the electrodes and lowering of the discharge capacity can be suppressed.

[Method for Producing the Coated Positive Electrode Active Substance Coated with Lithium Metaphosphate]

Such a coated positive electrode active substance can be prepared by coating the surface of the positive electrode active substance with lithium metaphosphate by soaking the positive electrode active substance in a coating-forming liquid comprising lithium metaphosphate.

A method for producing a positive electrode active substance for a lithium secondary battery according to the exemplary embodiment comprises, for example, a step of soaking a positive electrode active substance in a coating-forming liquid in which lithium metaphosphate is dissolved in a solvent (for example, water) to coat the surface of the positive electrode active substance with the lithium metaphosphate to thereby form a coated positive electrode active substance, a step of separating and removing the coating-forming liquid (for example, solid-liquid separation such as filtering off), and a step of thereafter washing the positive electrode active substance with a solvent (for example, water) capable of dissolving lithium metaphosphate. Since a positive electrode active substance is soaked in a coating-forming liquid comprising lithium metaphosphate to be subjected to a coating treatment without being subjected to another coating treatment before the coating treatment with lithium metaphosphate, the whole surface of the positive electrode active substance can be directly coated with lithium metaphosphate without an interposed layer formed between the surface of the positive electrode active substance and the lithium metaphosphate.

The coating-forming liquid can be prepared by dissolving lithium metaphosphate in water. The content of lithium metaphosphate in the coating-forming liquid is preferably 0.05 to 15% by mass, and more preferably 0.1 to 10% by mass.

The positive electrode active substance is added to the coating-forming liquid, and soaked therein, for example, at room temperature (for example, 25° C.) to 100° C. (preferably 40 to 100° C., more preferably 50 to 100° C.) for 1 hour to 24 hours to thereby allow the positive electrode active substance and lithium metaphosphate to react. Thereafter, the positive electrode active substance is filtered off, and further washed with water to thereby remove unreacted lithium metaphosphate. As a result, a coating of lithium metaphosphate bound to the positive electrode surface is formed. Then, the resultant is dried at room temperature (for example, 25° C.) to 150° C. under vacuum or atmospheric pressure, and thereafter heat treated at 250 to 500° C. in air or in an inert atmosphere for 1 hour to 24 hours. A coated positive electrode active substance can thus be obtained.

Further a coated positive electrode active substance can also be obtained by adding the positive electrode active substance to the coating-forming liquid, and soaking the positive electrode active substance, for example, at room temperature (for example, 25° C.) to 100° C. (preferably 40 to 100° C., more preferably 50 to 100° C.) for 1 hour to 24 hours to thereby allow the positive electrode active substance and lithium metaphosphate to react, thereafter, instead of filtering off, heat-evaporating water, and washing the resultant with water to thereby remove unreacted lithium metaphosphate, and heat-treating (heat-drying) the resultant as described above.

Then, the coated positive electrode active substance coated with lithium metaphosphate produced in the above method may be coated further with an oxide containing an element such as Sn, Mg, Ti, Al, Zr, Cr, V, Ga, Ge, Sm, Zn, Cu, Bi, Mo or La (for example, SnO, MgO, TiO$_2$, Al$_2$O$_3$, ZrO, V$_2$O$_5$, Ga$_2$O$_3$, GeO$_2$, Sm$_2$O$_3$, ZnO, MoO$_3$ or La$_2$O$_3$).

A method for forming a coating of the oxide involves, for example, adding the positive electrode active substance to a solution of a nitric salt, sulfate salt, a metal alkoxide or the like of the above metal element, heating and reacting the mixture, evaporating moisture, and thereafter heat-treating the resultant at 250° C. to 500° C. to thereby form the oxide coating.

[Positive Electrode]

A positive electrode for a lithium secondary battery according to the exemplary embodiment is one in which the positive electrode active substance layer comprising the coated positive electrode active substance is formed on a positive electrode current collector.

The positive electrode active substance layer suffices if comprising the coated positive electrode active substance, but for the purpose of reducing the impedance, a conductive auxiliary agent may be added. Examples of the conductive auxiliary agent include graphites such as natural graphite, artificial graphite or the like, and carbon blacks such as acetylene black, Ketjen black, furnace black, channel black and thermal black. The conductive auxiliary agent may be used by mixing a plurality of kinds thereof. The amount of the conductive auxiliary agent is, with respect to 100 parts by mass of the positive electrode active substance, preferably 1 to 10 parts by mass.

The positive electrode active substance layer is preferably one formed on a positive electrode current collector by binding and unifying particles of the coated positive electrode active substance thereon using a binder for the positive electrode. Examples of a binder for the positive electrode include polyvinylidene fluoride, vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, and polyamideimide. Particularly from the viewpoint of versatility and low costs, it is preferable to use a polyvinylidene fluoride as the binder for the positive electrode. The amount of the binder for the positive electrode is, from the viewpoint of the "sufficient binding capacity" and the "energy enhancement", which are in a tradeoff relationship, with respect to 100 parts by mass of the positive electrode active substance, preferably 2 to 10 parts by mass.

The positive electrode current collector is not especially limited, and for example, an aluminum foil, a stainless steel-made lath board or the like can be used.

The positive electrode can be produced by adding a solvent to a mixture of the positive electrode active substance comprising the coated positive electrode active substance, the binder, and as required, various auxiliary agents, and kneading the resultant to make a slurried coating liquid, and coating the current collector with the coating liquid followed by drying.

[Lithium Secondary Battery]

A lithium secondary battery according to the exemplary embodiment comprises the positive electrode, a negative electrode comprising a negative electrode active substance, an electrolyte solution to be impregnated in these electrodes, and an outer package accommodating these.

[Negative Electrode]

The negative electrode suffices if comprising a negative electrode active substance capable of intercalating and deintercalating lithium ions, and there can be used one formed by binding and unifying particles of the negative electrode active substance with a binder for negative electrode as a negative electrode active substance layer on the negative electrode current collector.

The negative electrode active substance includes metals or alloys alloyable with lithium, and oxides and carbon materials capable of intercalating and deintercalating lithium ions.

The above metals include simple silicon and tin, for example.

The oxides include silicon oxides represented by $SiO_x$ ($0<x\leq2$), niobium pentaoxide ($Nb_2O_5$), a lithium titanium composite oxide ($Li_{4/3}Ti_{5/3}O_4$), and titanium dioxide ($TiO_2$). Among these, the silicon oxides, since lessening the expansion and contraction of the negative electrode active substance itself associated with repeated charge and discharge, are preferably used from the viewpoint of charge and discharge cycle characteristics. For example, silicon oxides represented by $SiO_x$ ($0.5\leq x\leq1.5$) can be used.

The silicon oxide may be crystalline or noncrystalline, may be one containing lithium represented by $SiLi_yO_z$ ($y>0$, $2>z>0$), and may contain 0.1 to 5% by mass of one or more elements of nitrogen, boron and sulfur in trace amounts. The incorporation of the metal element or the nonmetal element in a trace amount to the silicon oxide enables the electroconductivity of the silicon oxide to be improved.

As the negative electrode active substance, use of a silicon oxide together with a simple silicon is preferable because of being able to suppress the volume change in charge and discharge. The negative electrode active substance comprising a simple silicon and a silicon oxide can be fabricated by mixing the simple silicon and the silicon oxide and sintering the mixture at a high temperature and under reduced pressure. Further as the negative electrode active substance, silicate salts, compounds of a transition metal with silicon, such as nickel silicide and cobalt silicide, and the like can also be used, in addition to the silicon oxide. The negative electrode active substance comprising, as a silicon compound, a compound of a transition metal with silicon can be fabricated, for example, by mixing and melting the simple silicon with the transition metal, or coating the simple silicon surface with the transition metal by vapor deposition or the like, or otherwise.

The carbon material as the negative electrode active substance is preferable because of being good in the cycle characteristics and the safety and excellent in continuous charge characteristics. Examples of the carbon material include graphite materials, amorphous carbon, diamond-like carbon, carbon nanotubes, carbon black, coke, mesocarbon microbeads, hard carbon, and graphite; the graphite material includes artificial graphite and natural graphite; and the carbon black includes acetylene black and furnace black. These can be used singly or in combinations of two or more. Graphite, high in crystallinity, is high in electroconductivity and excellent in adhesiveness with the negative electrode current collector and the voltage flatness. By contrast, amorphous carbon, low in crystallinity, since being relatively low in volume expansion, is large in an effect of lessening the volume expansion of the whole negative electrode and hardly causes deterioration due to heterogeneity including crystal grain boundaries and defects.

It is preferable that the negative electrode active substance comprises silicon, a silicon oxide and a carbon material, because of being able to suppress the volume change associated with charge and discharge; though these can be used simply by being mixed, it is preferable to make a composite (hereinafter, referred to also as a negative electrode composite) comprising these. It is preferable that the negative electrode composite be one having a structure in which the whole or a part of the silicon is dispersed in the silicon oxide wholly or partially having an amorphous structure and the surface is coated with carbon. The silicon oxide having an amorphous structure can suppress the volume expansion of the carbon material and the silicon, and the silicon being dispersed can also suppress the decomposition of an electrolyte solution. The mechanism is not clear, but it is presumed that the silicon oxide having an amorphous structure has some influence on the coating formation on the interface between the carbon material and the electrolyte solution. Further it is conceivable that the amorphous structure has relatively few factors caused by heterogeneity including crystal grain boundaries and defects. It can be confirmed by X-ray diffractometry that the whole or a part of the silicon oxide has an amorphous structure. In cases where the silicon oxide does not have any amorphous structure, in the X-ray diffractometry, a peak characteristic of the silicon oxide is intensely observed. On the other hand, in cases where the whole or a part of the silicon oxide has an amorphous structure, in the X-ray diffractometry, the peak characteristic of the silicon oxide becomes broad.

It can be confirmed by combined use of transmission electron microscope observation and energy-dispersive X-ray spectroscopy that the whole or a part of the silicon is dispersed in the silicon oxide. Specifically, the cross-section of a sample is observed by a transmission electron microscope, and the oxygen concentration in silicon moieties dispersed in the silicon oxide is measured by energy-dispersive X-ray spectroscopy. As a result, it can be confirmed that silicon dispersed in the silicon oxide does not become oxides.

With respect to the content proportions of the silicon, the silicon oxide and the carbon material in the negative electrode composite, the content of the silicon is, in the negative electrode composite, preferably made to be 5% by mass or higher and 90% by mass or lower, and more preferably made to be 20% by mass or higher and 50% by mass or lower. The content of the silicon oxide is, in the negative electrode composite, preferably made to be 5% by mass or higher and 90% by mass or lower, and more preferably made to be 40% by mass or higher and 70% by mass or lower. The content of the carbon material is, in the negative electrode composite, preferably made to be 2% by mass or higher and 50% by mass or lower, and more preferably made to be 2% by mass or higher and 30% by mass or lower.

Such a negative electrode composite can be fabricated, for example, by a method disclosed in JP2004-47404A. That is, by carrying out a CVD treatment in an atmosphere containing an organic gas such as methane gas on the silicon oxide, the negative electrode composite can be obtained in which silicon is nano-clustered in the silicon oxide, and the surface is coated with carbon. Further the surface of the negative electrode composite can also be treated with a silane coupling agent or the like.

The negative electrode active substance may also be a mixture of a particulate simple silicon, silicon oxide and carbon material. For example, the average particle diameter of the simple silicon can be configured so as to be smaller than those of the carbon material and the silicon oxide. When thus configured, since the simple silicon, having a large volume change in the charge and discharge time, has relatively a small particle diameter, and the carbon material and silicon oxide, having small volume changes, have relatively large particle diameters, the dendrite formation and the micropowderization of the alloy are more effectively suppressed. Then, in the course of charge and discharge, particles having large particle diameters and particles having small particle diameters alternately intercalate and deintercalate lithium ions; also from this point, the generation of the residual stress and residual strain is suppressed.

The average particle diameter of the simple silicon is, for example, preferably 20 μm or smaller, and more preferably 15 μm or smaller. Then, the average particle diameter of the silicon oxide is preferably ½ or smaller of that of the carbon material; and the average particle diameter of the simple silicon is preferably ½ of that of the silicon oxide. When the average particle diameters are controlled in the above ranges, since the lessening effect of the volume expansion can more effectively be attained, a secondary battery excellent in the balance among the energy density, the cycle life and the efficiency can be obtained. The average particle diameters of the simple silicon, the silicon oxide and the like are measured as 50%-cumulative diameters $D_{50}$ (median diameters) by a measuring method such as a laser diffraction scattering method or a dynamic light scattering method.

The amount of the negative electrode active substance in the negative electrode active substance layer is preferably 55% by mass or larger, and more preferably 65% by mass or larger.

The binder for the negative electrode is not especially limited, but there can be used, for example, polyvinylidene fluoride, vinylidene fluoride-hexafuoropropylene copolymers, vinylidene fluoride-tetrafluoroethylene copolymers, styrene-butadiene copolymer rubber (SBR), polytetrafluoroethylene, polypropylene, polyethylene, polyimide, polyamideimide, and polyacrylic acid or carboxymethylcellulose, including a lithium salt, a sodium salt or a potassium salt neutralized with an alkali. Among these, from the viewpoint of strong bindability, preferable are polyimide, polyamideimide, SBR, and polyacrylic acid or carboxymethylcellulose, including a lithium salt, a sodium salt or a potassium salt neutralized with an alkali. The amount of the binder for the negative electrode to be used is, from the viewpoint of the "sufficient binding capacity" and the "energy enhancement", which are in a tradeoff relationship, preferably 5 to 25 parts by mass with respect to 100 parts by mass of the negative electrode active substance.

The material of the negative electrode current collector includes metal materials such as copper, nickel and stainless steels. Among these, from the viewpoint of workability and cost, copper is especially preferable. It is preferable that the surface of the negative electrode current collector have been previously subjected to a surface-roughening treatment. Further the shape of the current collector may be optional, and includes foil shapes, flat plate shapes and mesh shapes. A current collector of a perforated type such as an expanded metal or a punching metal can also be used.

The negative electrode can be produced by adding a solvent to a mixture of the negative electrode active substance, the binder, and as required, various auxiliary agents, and kneading the resultant to make a slurried coating liquid, and coating the current collector with the coating liquid followed by drying, as in the positive electrode active substance layer.

[Electrolyte Solution]

With respect to the electrolyte solution, one in which an electrolyte is dissolved in a nonaqueous solvent can be used.

As the solvent, cyclic carbonates, chain carbonates, chain esters, lactones, ethers, sulfones, nitriles and phosphate esters, and the like can be used.

The cyclic carbonates include propylene carbonate, ethylene carbonate, butylene carbonate, vinylene carbonate and vinylethylene carbonate.

The chain carbonates include dimethyl carbonate, diethyl carbonate, dipropyl carbonate, dibutyl carbonate, ethyl methyl carbonate, methyl propyl carbonate, methyl isopropyl carbonate and methyl butyl carbonate.

The chain esters include methyl formate, methyl acetate, methyl propionate, ethyl propionate, methyl pivalate and ethyl pivalate; the lactones include γ-butyrolactone, δ-valerolactone and α-methyl-γ-butyrolactone; and the ethers include tetrahydrofuran, 2-methyltetrahydrofuran, 1,3-dioxolane, 1,3-dioxane, 1,4-dioxane, 1,2-dimethoxyethane, 1,2-diethoxyethane and 1,2-dibutoxyethane.

The sulfones include sulfolane, 3-methylsulfolane and 2,4-dimethylsulfolane; the nitriles include acetonitrile, propionitrile, succinonitrile, glutaronitrile and adiponitrile; and the phosphate esters include trimethyl phosphate, triethyl phosphate, tributyl phosphate and trioctyl phosphate.

Here, the nonaqueous solvent can be used singly or in combinations of two or more. The combination of a plurality of nonaqueous solvents includes combinations of, for example, a cyclic carbonate and a chain carbonate. Among these, from the viewpoint of achieving excellent battery characteristics, more preferable is a combination containing, at least, a cyclic carbonate and a chain carbonate.

Further to a combination of a cyclic carbonate and a chain carbonate, as a third solvent, there may be added at least one selected from fluorinated ether-based solvents, fluorinated carbonate-based solvents, fluorinated phosphate ester solvents and the like.

Specific examples of the fluorinated ether-based solvents include $CF_3OCH_3$, $CF_3OC_2H_5$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CF_2)_4CH_2O(CF_2)^2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2CH_2OCH_2CF_2CF_3$, $H(CF_2)_2CH_2OCF_2CHFCF_3$, $CHF_2CH_2OCF_2CFHCF_3$, $F(CF_2)_2CH_2OCF_2CFHCF_3$, $CF_3(CF_2)_3OCHF_2$.

Further the fluorinated carbonate-based solvents include fluoroethylene carbonate, fluoromethyl methyl carbonate, 2-fluoroethyl methyl carbonate, ethyl-(2-fluoroethyl) carbonate, (2,2-difluoroethyl) ethyl carbonate, bis(2-fluoroethyl) carbonate and ethyl-(2,2,2-trifluoroethyl) carbonate.

The fluorinated phosphate esters include tris(2,2,2-trifluoroethyl) phosphate, tris(trifluoromethyl) phosphate and tris(2,2,3,3-tetrafluoropropyl) phosphate.

Then, specific examples of the electrolyte salts (supporting salts) include lithium salts such as $LiPF_6$, $LiBF_4$ and $LiClO_4$, and $LiN(SO_2F)_2$, $LiN(SO_2CF_3)_2$, $LiN(SO_2C_2F_5)_2$, $CF_3SO_3Li$, $C_4F_9SO_3Li$, and $LiAsF_6$, $LiAlCl_4$, $LiSbF_6$, $LiPF_4(CF_3)_2$, $LiPF_3(C_2F_5)_3$, $LiPF_3(CF_3)_3$, $(CF_2)_2(SO_2)_2NLi$, $(CF_2)_3(SO_2)_2Li$. Further lithium bis(oxalate)borate and lithium oxaltodifluoroborate can also be used. These electrolyte salts can be used singly or in combinations of two or more. Among these, preferable are $LiPF_6$, $LiBF_4$, $LiN(SO_2F)_2$, $LiN(SO_2CF_3)_2$ and $LiN(SO_2C_2F_5)_2$.

The concentration of the electrolyte salt in the electrolyte solution is preferably 0.1 to 3M, and more preferably 0.5 to 2M.

The electrolyte solution may further comprise, as other components, for example, vinylene carbonate, maleic anhydride, ethylene sulfite, borate esters, 1,3-propanesultone and 1,5,2,4-dioxadithiane-2,2,4,4-tetraoxide.

[Separator]

As the separator, a monolayer or laminated porous film or nonwoven fabric of a polyolefin such as polypropylene or polyethylene, aramid, polyimide and the like can be used. The separator further includes inorganic materials such as glass fibers, polyolefin films coated with a fluorine compound or inorganic microparticles, laminates of a polyethylene film and a polypropylene film, and a laminate of a polyolefin film with an aramid layer.

The thickness of the separator is, from the viewpoint of the energy density of the battery and the mechanical strength of the separator, preferably 5 to 50 μm, and more preferably 10 to 40 μm.

[Method for Producing the Lithium Secondary Battery]

A method for producing the lithium secondary battery according to the present invention comprises, for example, the steps of accommodating a pair of electrodes in which the positive electrode and the negative electrode are made to face each other through the separator (or a laminate comprising a plurality of the electrode pair meeting a predetermined capacity) in an outer package, injecting the electrolyte solution, and sealing the outer package.

[Shape of the Lithium Secondary Battery]

The above-mentioned constitution of the lithium secondary battery can be applied to coin batteries, cylindrical batteries, laminate-type batteries and the like having monolayer or layered-type separators.

For example, in the case of a laminate-type lithium ion battery, the battery has a shape in which the positive electrode, the separator and the negative electrode are alternately laminated; these electrodes are connected to the tabs of metal terminals respectively; the resultant is put in the outer package of a laminate film or the like; the electrolyte solution is injected; and the outer package is sealed.

[Outer Package]

It is preferable that the outer package be one having a strength of being capable of stably holding the positive electrode and the negative electrode laminated through the separator and the electrolyte solution impregnated therein, and having the electrochemical stability to these substances and the airtightness and watertightness. For the outer package, there can be used, specifically, for example, stainless steel, nickel-plated iron, aluminum, titanium, or an alloy thereof or a plated one thereof, or a metal laminate resin film (metal laminate film).

The metal laminate film is one made by laminating a metal thin film on a heat-fusible resin film, and preferably, is stable to the electrolyte solution and has the airtightness and watertightness.

As the heat-fusible resin, there can be used polypropylene and polyethylene; acid-modified polypropylene and polyethylene; polyphenylene sulfide; polyester such as polyethylene terephthalate; polyamide; ethylene-vinyl acetate copolymers; and ionomer resins made by intermolecularly bonding an ethylene-methacrylic acid copolymer or an ethylene-acrylic acid copolymer with a metal ion, and the like. The thickness of the heat-fusible resin film is preferably 10 to 200 μm, and more preferably 30 to 100 μm.

As the metal thin film, polypropylene and polyethylene coated with aluminum, silica or alumina, and the like can be used. From the viewpoint of suppressing the volume expansion, an aluminum laminate film is preferable. Further the metal laminate film includes ones made by laminating a protection layer composed of a film of a polyester such as a polyethylene terephthalate, a polyamide or the like on the surface of the above metal laminate film having no metal thin film provided thereon.

[Configuration Example of a Battery]

Figure 1:
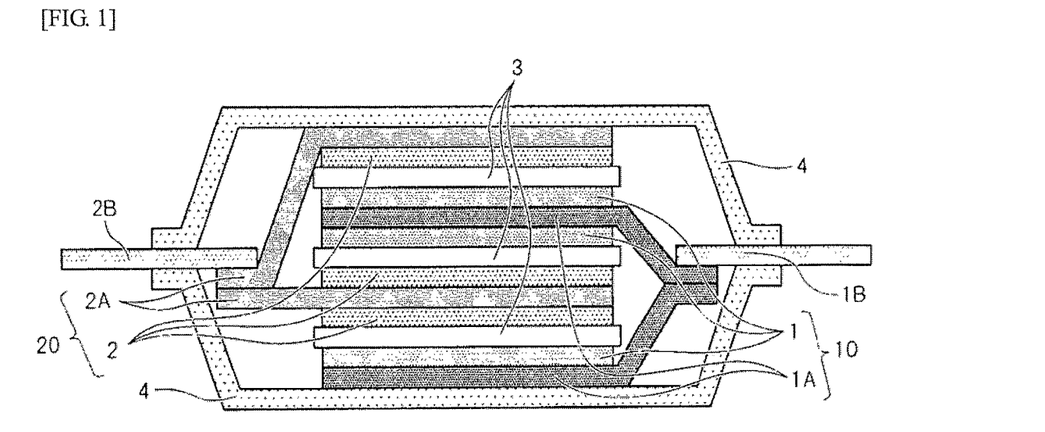
FIG. 1 is a schematic cross-sectional view illustrating a constitution of one example of a lithium secondary battery according to an exemplary embodiment.

One example of a lithium secondary battery (lithium ion secondary battery) according to the exemplary embodiment is illustrated in a schematic constitution view of FIG. 1. In the lithium secondary battery shown in FIG. 1, a positive electrode 10 in which a positive electrode active substance layer 1 is provided on both surfaces or one surface of positive electrode current collectors 1A and a negative electrode 20 in which a negative electrode active substance layer 2 is provided on both surfaces or one surface of negative electrode current collectors 2A are laminated through porous separators 3, and accommodated together with an electrolyte solution (not shown in figure) in outer packages 4 composed of an aluminum-deposited laminate film. A positive electrode tab 1B formed of an aluminum plate is connected to a portion of the positive electrode current collectors 1A where no positive electrode active substance layer 1 is provided; and a negative electrode tab 2B formed of a nickel plate is connected to a portion of the negative electrode current collectors 2A where no negative electrode active substance layer 2 is provided, and the tips of the tabs are led out outside the outer packages 4.

EXAMPLES

Hereinafter, there will be described in detail positive electrode active substances for a lithium secondary battery, positive electrodes for a lithium secondary battery, methods for producing these, and lithium secondary batteries using these according to the exemplary embodiments, but the present invention is not any more limited to these Examples.

[Synthesis Example 1] Production Example 1 of a Positive Electrode Active Substance for a Lithium Secondary Battery 0.8591 g of lithium metaphosphate (manufactured by Mitsuwa Chemicals Co., Ltd., No. 63697) was dissolved in 100 ml of water (0.1 mol/L, 0.85% by mass) to thereby prepare a coating-forming liquid. 50 g of a lithium transition metal composite oxide ($Li_{1.26}Fe_{0.11}Ni_{0.11}Mn_{0.52}O_2$) was added to the obtained coating-forming liquid, and was left to stand at 60° C. for 3 hours. The lithium oxide was filtered off from the resulting solution, and washed with water; thereafter, the washed lithium oxide was dried under reduced pressure at 120° C. for 1 hour, and further dried in an air flow at 400° C. at normal pressure for 1 hour. As a result, a coated positive electrode active substance was obtained in which the positive electrode active substance (lithium transition metal composite oxide) before the coating was coated with lithium metaphosphate at an amount used for coating (amount bound) of 0.3% by mass with respect to the positive electrode active substance before the coating. Here, the amount of the lithium metaphosphate used for coating with respect to the positive electrode active substance was determined based on the amount of unreacted lithium metaphosphate remaining in the reaction solution recovered by the filtering-off.

[Synthesis Example 2] Production Example 2 of a Positive Electrode Active Substance for a Lithium Secondary Battery A coated positive electrode active substance was obtained as in Synthesis Example 1, except for leaving the coating-forming liquid having the lithium transition metal composite oxide ($Li_{1.26}Fe_{0.11}Ni_{0.11}Mn_{0.52}O_2$) added thereto to stand at 80° C. for 3 hour instead of leaving the coating-forming liquid at 60° C. for 3 hours. The amount of lithium metaphosphate used for coating (bound) with respect to the positive electrode active substance was 0.8% by mass.

Figure 2:
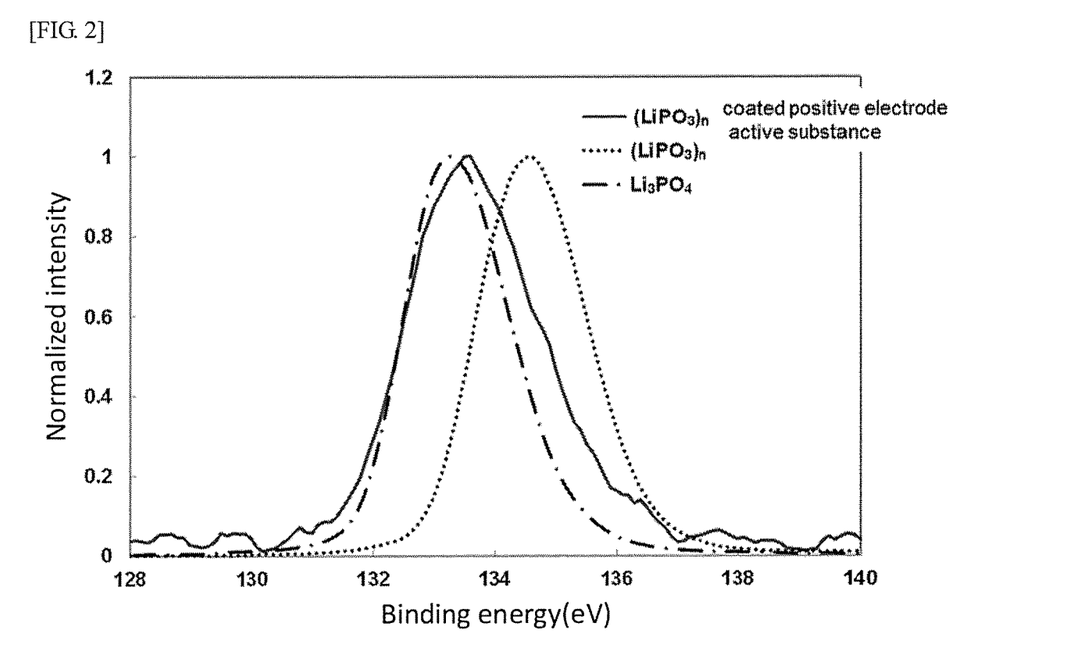
FIG. 2 is a diagram showing P2p spectra of XPS spectra of a positive electrode active substance fabricated in Examples of the present invention.

There are shown in FIG. 2 the spectra of P2p acquired by respective XPS analyses of the obtained positive electrode active substance, lithium metaphosphate ($Li(PO_3)_n$) and lithium phosphate ($Li_3PO_4$). From these results, it was confirmed that by coating the positive electrode active substance with lithium metaphosphate, the lithium metaphosphate chemically reacted and bound on the positive electrode active substance surface and consequently had a chemical structure different from lithium metaphosphate and lithium phosphate.

[Synthesis Example 3] Production Example 3 of a Positive Electrode Active Substance for a Lithium Secondary Battery A coated positive electrode active substance was obtained as in Synthesis Example 2, except for dissolving 1.7182 g of lithium metaphosphate in 100 ml of water (0.2 mol/L, 1.7% by mass) instead of dissolving 0.8591 g of lithium metaphosphate in 100 ml of water. The amount of lithium metaphosphate used for coating (bound) with respect to the positive electrode active substance was 2.3% by mass.

[Synthesis Example 4] Production Example 4 of a Positive Electrode Active Substance for a Lithium Secondary Battery A coated positive electrode active substance was obtained as in Synthesis Example 2, except for dissolving 2.5773 g of lithium metaphosphate in 100 ml of water (0.3 mol/L, 2.6% by mass) instead of dissolving 0.8591 g of lithium metaphosphate in 100 ml of water. The amount of lithium metaphosphate used for coating (bound) with respect to the positive electrode active substance was 4.7% by mass.

[Synthesis Example 5] Production Example 5 of a Positive Electrode Active Substance for a Lithium Secondary Battery A coated positive electrode active substance was obtained as in Synthesis Example 2, except for dissolving 5.1546 g of lithium metaphosphate in 100 ml of water (0.6 mol/L, 5.1% by mass) instead of dissolving 0.8591 g of lithium metaphosphate in 100 ml of water. The amount of lithium metaphosphate used for coating (bound) with respect to the positive electrode active substance was 9.7% by mass.

[Synthesis Example 6] Production Example 6 of a Positive Electrode Active Substance for a Lithium Secondary Battery A coated positive electrode active substance was obtained as in Synthesis Example 2, except for using a lithium transition metal composite oxide ($Li_{1.23}Fe_{0.15}Ni_{0.15}Mn_{0.46}O_2$) instead of using the lithium transition metal composite oxide ($Li_{1.26}Fe_{0.11}Ni_{0.11}Mn_{0.52}O_2$). The amount of lithium metaphosphate used for coating (bound) with respect to the positive electrode active substance was 0.7% by mass.

[Synthesis Example 7] Production Example 7 of a Positive Electrode Active Substance for a Lithium Secondary Battery A coated positive electrode active substance was obtained as in Synthesis Example 2, except for using a lithium transition metal composite oxide ($Li_{1.2}Ni_{0.18}Mn_{0.54}Co_{0.08}O_2$) instead of using the lithium transition metal composite oxide ($Li_{1.26}Fe_{0.11}Ni_{0.11}Mn_{0.52}O_2$). The amount of lithium metaphosphate used for coating (bound) with respect to the positive electrode active substance was 0.7% by mass.

[Synthesis Example 8] Production Example 8 of a Positive Electrode Active Substance for a Lithium Secondary Battery A coated positive electrode active substance was obtained as in Synthesis Example 2, except for using a lithium transition metal composite oxide ($LiNi_{0.8}Co_{0.15}Al_{0.05}O_2$) instead of using the lithium transition metal composite oxide ($Li_{1.26}Fe_{0.11}Ni_{0.11}Mn_{0.52}O_2$). The amount of lithium metaphosphate used for coating (bound) with respect to the positive electrode active substance was 0.6% by mass.

[Synthesis Example 9] Production Example 9 of a Positive Electrode Active Substance for a Lithium Secondary Battery A coated positive electrode active substance was obtained as in Synthesis Example 2, except for using a lithium transition metal composite oxide ($LiNi_{0.8}Co_{0.1}Mn_{0.1}O_2$) instead of using the lithium transition metal composite oxide ($Li_{1.26}Fe_{0.11}Ni_{0.11}Mn_{0.52}O_2$). The amount of lithium metaphosphate used for coating (bound) with respect to the positive electrode active substance was 0.5% by mass.

[Synthesis Example 10] Production Example 10 of a Positive Electrode Active Substance for a Lithium Secondary Battery A coated positive electrode active substance was obtained as in Synthesis Example 2, except for using a lithium transition metal composite oxide ($Li_{1.26}Fe_{0.11}Ni_{0.11}Mn_{0.52}O_2$) coated with 1% by mass of samarium oxide ($Sm_2O_3$) instead of using the lithium transition metal composite oxide ($Li_{1.26}Fe_{0.11}Ni_{0.11}Mn_{0.52}O_2$). The amount of lithium metaphosphate used for coating (bound) with respect to the positive electrode active substance was 0.4% by mass.

[Example 1] Production Example 1 of a Lithium Secondary Battery

A solvent was added to a mixture containing 92% by mass of the coated positive electrode active substance (amount of lithium metaphosphate used for coating: 0.3% by mass, active substance: $Li_{1.26}Fe_{0.11}Ni_{0.11}Mn_{0.52}O_2$) obtained in Synthesis Example 1, 4% by mass of Ketjen black and 4% by mass of a polyvinylidene fluoride to thereby prepare a slurry. Then, a positive electrode current collector composed of an aluminum foil (thickness: 20 μm) was coated with the slurry followed by drying to fabricate a positive electrode active substance layer of 175 μm in thickness to thereby obtain a positive electrode. Further a positive electrode active substance layer was formed on one surface of a positive electrode current collector by the same procedure, and a positive electrode active substance layer was formed on the other surface of the positive electrode current collector on which no positive electrode active substance layer had been provided, by the same procedure to thereby also fabricate a positive electrode having the positive electrode active substance layer on the either side.

A solvent was added to a mixture containing 85% by mass of a silicon oxide (SiO) of 15 μm in average particle diameter and 15% by mass of a polyamic acid to thereby prepare a slurry. Then, a negative electrode current collector composed of a copper foil (thickness: 10 μm) was coated with the slurry followed by drying to fabricate a negative electrode active substance layer of 46 μm in thickness. Then, the fabricated negative electrode active substance layer was annealed in a nitrogen atmosphere at 350° C. for 3 hours to cure the binder to thereby obtain a negative electrode.

A 1.0M $LiPF_6$ was dissolved in a mixed solvent of ethylene carbonate (EC) and diethyl carbonate (DEC) in 30:70 in volume ratio to thereby prepare an electrolyte solution.

A positive electrode tab and a negative electrode tab were welded to the positive electrode current collectors and the negative electrode current collectors, respectively, and thereafter, a separator of a porous film was interposed each between the fabricated positive electrodes and the negative electrodes to thereby form a laminate. The laminate was covered with two sheets of aluminum laminate film outer packages, and three superposed sides of the outer packages were thermally fused and sealed. The electrolyte solution was injected into the formed outer package container, and was impregnated at a suitable vacuum in the laminate. Thereafter, under reduced pressure, one superposed side left thermally unfused of the outer packages was then thermally fused and sealed to thereby fabricate a lithium secondary battery before an activation treatment.

The fabricated lithium secondary battery before an activation treatment was charged up to 4.5 V at a current of 20 mA (20 mA/g) per 1 g of the positive electrode active substance. Thereafter, the battery was discharged down to 1.5 V at a current of 20 mA (20 mA/g) per 1 g of the positive electrode active substance. After the discharge to 1.5 V, the battery was similarly charged up to 4.5 V and then discharged down to 1.5 V at 20 mA/g, thus carrying out an activation treatment in which the charge and discharge cycle was repeated twice. Thereafter, gases in the battery interior was extracted by pressure reduction by breaking a sealed portion of the outer packages and the broken portion was re-sealed to thereby fabricate a lithium secondary battery.

[Evaluation of the Lithium Secondary Battery]

[The Initial Capacity and the Capacity Retention Rate]

The obtained lithium secondary battery was charged, in a thermostatic chamber at 45° C., at a constant current of 40 mA/g up to 4.5 V, and continuously charged at a constant voltage of 4.5 V until the current became 5 mA/g. Thereafter, the battery was discharged at a current of 5 mA/g down to 1.5 V; and an acquired discharge capacity was defined as an initial capacity. Then, the lithium secondary battery was charged, in a thermostatic chamber at 45° C., at a constant current of 40 mA/g up to 4.5 V, and continuously charged at a constant voltage of 4.5 V until the current became 5 mA/g, and thereafter discharged at a current of 40 mA/g down to 1.5 V. The charge and discharge under this condition was repeated 30 times in total. A capacity retention rate after the 30th cycle was determined from a ratio of a discharge capacity acquired at the 30th cycle to a first-cycle discharge capacity (initial capacity) acquired at the first cycle. Results are shown in Table 1.

[Amount of Gases Generated]

The amount of gases generated in the 30 cycles was measured by the Archimedes method; and then the amount of gases generated was indicated as a relative ratio where the amount of gases generated in a Comparative Example using the same positive electrode active substance except for being coated with no lithium metaphosphate was taken to be 100. Results are shown in Table 1.

[Example 2] Production Example 2 of a Lithium Secondary Battery

A lithium secondary battery was fabricated and evaluated as in Example 1, except for using the coated positive electrode active substance (amount of lithium metaphosphate used for coating: 0.8% by mass, active substance: $Li_{1.26}Fe_{0.11}Ni_{0.11}Mn_{0.52}O_2$) obtained in Synthesis Example 2 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 3] Production Example 3 of a Lithium Secondary Battery

A lithium secondary battery was fabricated and evaluated as in Example 1, except for using the coated positive electrode active substance (amount of lithium metaphosphate used for coating: 2.3% by mass, active substance: $Li_{1.26}Fe_{0.11}Ni_{0.11}Mn_{0.52}O_2$) obtained in Synthesis Example 3 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 4] Production Example 4 of a Lithium Secondary Battery

A lithium secondary battery was fabricated and evaluated as in Example 1, except for using the coated positive electrode active substance (amount of lithium metaphosphate used for coating: 4.7% by mass, active substance: $Li_{1.26}Fe_{0.11}Ni_{0.11}Mn_{0.52}O_2$) obtained in Synthesis Example 4 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 5] Production Example 5 of a Lithium Secondary Battery

A lithium secondary battery was fabricated and evaluated as in Example 1, except for using the coated positive electrode active substance (amount of lithium metaphosphate used for coating: 9.7% by mass, active substance: $Li_{1.26}Fe_{0.11}Ni_{0.11}Mn_{0.52}O_2$) obtained in Synthesis Example 5 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 6] Production Example 6 of a Lithium Secondary Battery

A lithium secondary battery was fabricated and evaluated as in Example 1, except for using the coated positive electrode active substance (amount of lithium metaphosphate used for coating: 0.7% by mass, active substance: $Li_{1.23}Fe_{0.15}Ni_{0.15}Mn_{0.46}O_2$) obtained in Synthesis Example 6 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 7] Production Example 7 of a Lithium Secondary Battery

A lithium secondary battery was fabricated and evaluated as in Example 1, except for using the coated positive electrode active substance (amount of lithium metaphosphate used for coating: 0.7% by mass, active substance: $Li_{1.26}Ni_{0.18}Mn_{0.54}Co_{0.08}O_2$) obtained in Synthesis Example 7 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 8] Production Example 8 of a Positive Electrode for a Lithium Secondary Battery A lithium secondary battery was fabricated and evaluated as in Example 1, except for using the coated positive electrode active substance (amount of lithium metaphosphate used for coating: 0.6% by mass, active substance: $LiNi_{0.8}Co_{0.15}Al_{0.05}O_2$) obtained in Synthesis Example 8 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

[Example 9] Production Example 9 of a Positive Electrode for Lithium Secondary Battery A lithium secondary battery was fabricated and evaluated as in Example 1, except for using the coated positive electrode active substance (amount of lithium metaphosphate used for coating: 0.5% by mass, active substance: $LiNi_{0.8}Co_{0.1}Mn_{0.1}O_2$) obtained in Synthesis Example 9 instead of using the coated positive electrode active substance (amount of lithium metaphosphate used for coating: 0.3% by mass, composition of the active substance: $Li_{1.26}Fe_{0.11}Ni_{0.11}Mn_{0.52}O_2$) obtained in Synthesis Example 1. Results are shown in Table 1.

Example 10

A lithium secondary battery was fabricated and evaluated as in Example 2, except for using an electrolyte solution in which a 1.0M $LiPF_6$ was dissolved in a mixed solvent of ethylene carbonate (EC), diethyl carbonate (DEC) and 1,1,2,2-tetrafluoroethyl-2,2,3,3-tetrafluoropropyl ether (TFETFP) in 28.5:66.5:5 in volume ratio instead of using the electrolyte solution in which a 1.0M $LiPF_6$ was dissolved in a mixed solvent of ethylene carbonate (EC) and diethyl carbonate (DEC) in 30:70 in volume ratio. Results are shown in Table 1.

Example 11

A lithium secondary battery was fabricated and evaluated as in Example 2, except for using an electrolyte solution in which a 1.0M $LiPF_6$ was dissolved in a mixed solvent of ethylene carbonate (EC), diethyl carbonate (DEC) and (2,2-difluoroethyl) ethyl carbonate (DFEEC) in 28.5:66.5:5 in volume ratio instead of using the electrolyte solution in which a 1.0M $LiPF_6$ was dissolved in a mixed solvent of ethylene carbonate (EC) and diethyl carbonate (DEC) in 30:70 in volume ratio. Results are shown in Table 1.

[Example 12] Production Example 12 of a Positive Electrode for a Lithium Secondary Battery A lithium secondary battery was fabricated and evaluated as in Example 1, except for using the coated positive electrode active substance (amount of lithium metaphosphate used for coating: 0.4% by mass, active substance: $Li_{1.26}Fe_{0.11}Ni_{0.11}Mn_{0.52}O_2$ coated with 1% by mass of samarium oxide ($Sm_2O_3$)) obtained in Synthesis Example 10 instead of using the coated positive electrode active substance (amount of lithium metaphosphate used for coating: 0.3% by mass, active substance: $Li_{1.26}Fe_{0.11}Ni_{0.11}Mn_{0.52}O_2$) obtained in Synthesis Example 1. Results are shown in Table 1.

Comparative Example 1

A lithium secondary battery was fabricated and evaluated as in Example 1, except for using the lithium transition metal composite oxide ($Li_{1.26}Fe_{0.11}Ni_{0.11}Mn_{0.52}O_2$) coated with no lithium metaphosphate instead of using a coated positive electrode active substance. Results are shown in Table 1.

Comparative Example 2

A lithium ion secondary battery was fabricated and evaluated as in Example 1, except for using, as the slurry to form the positive electrode active substance layer, a slurry containing 92% by mass of the lithium transition metal composite oxide ($Li_{1.26}Fe_{0.11}Ni_{0.11}Mn_{0.52}O_2$) coated with no lithium metaphosphate, 4% by mass of Ketjen black and 4% by mass of a polyvinylidene fluoride, and being added with lithium metaphosphate of 0.8% by mass with respect to the lithium transition metal composite oxide. Results are shown in Table 1.

Comparative Example 3

A lithium secondary battery was fabricated and evaluated as in Example 1, except for using the lithium transition metal composite oxide ($Li_{1.23}Fe_{0.15}Ni_{0.15}Mn_{0.46}O_2$) coated with no lithium metaphosphate instead of using a coated positive electrode active substance. Results are shown in Table 1.

Comparative Example 4

A lithium secondary battery was fabricated and evaluated as in Example 1, except for using the lithium transition metal composite oxide ($Li_{1.2}Ni_{0.18}Mn_{0.54}Co_{0.08}O_2$) coated with no lithium metaphosphate instead of using a coated positive electrode active substance. Results are shown in Table 1.

Comparative Example 5

A lithium secondary battery was fabricated and evaluated as in Example 1, except for using the lithium transition metal composite oxide ($LiNi_{0.8}Co_{0.15}Al_{0.05}O_2$) coated with no lithium metaphosphate instead of using a coated positive electrode active substance. Results are shown in Table 1.

Comparative Example 6

A lithium secondary battery was fabricated and evaluated as in Example 1, except for using the lithium transition metal composite oxide ($LiNi_{0.8}Co_{0.1}Mn_{0.1}O_2$) coated with no lithium metaphosphate instead of using a coated positive electrode active substance. Results are shown in Table 1.

Comparative Example 7

A lithium secondary battery was fabricated and evaluated as in Example 1, except for using the lithium transition metal composite oxide ($Li_{1.26}Fe_{0.11}Ni_{0.11}Mn_{0.52}O_2$ coated with 1% by mass of samarium oxide ($Sm_2O_3$)) coated with no lithium metaphosphate instead of using a coated positive electrode active substance. Results are shown in Table 1.

With respect to the amount of gases generated, comparing Examples 1 to 5 and 10 and 11 with Comparative Example 1, it was confirmed that the amount was reduced to about 8 to 30%. Then with respect to the initial capacity, it was confirmed that the coating with lithium metaphosphate caused the capacity not to decrease greatly. On the other hand, comparing Example 2 with Comparative Example 2, it was confirmed that only addition of lithium metaphosphate to the positive electrode slurry had a small effect on suppressing gas generation and greatly decreased the initial capacity.

Further comparing Examples 6, 7, 8, 9 and 12 with Comparative Examples 3, 4, 5, 6 and 7, respectively, it was confirmed that the amount of gases generated was reduced.

Then, with respect to the capacity retention rate, it was confirmed that Examples 1 to 12 were improved more by 10 or more points than Comparative Examples 1 to 7.

As described above, lithium secondary batteries using a positive electrode active substance coated with lithium metaphosphate according to the exemplary embodiments exhibited the following excellent properties: the initial capacity does not decrease greatly; the gas generation associated with the charge and discharge cycles can be suppressed; and a high capacity retention rate can be obtained.

TABLE 1

| | Positive Electrode Active Substance | Amount of Lithium Metaphosphate Used for Coating (% by mass) | Composition of Electrolyte Solution Solvent | Initial Capacity[1] | Amount of Gases Generated[2] | Capacity Retention Rate |
|---|---|---|---|---|---|---|
| Example 1 | $Li_{1.26}Fe_{0.11}Ni_{0.11}Mn_{0.52}O_2$ | 0.3 | EC/DEC (3/7) | 100 | 25 | 70 |
| Example 2 | $Li_{1.26}Fe_{0.11}Ni_{0.11}Mn_{0.52}O_2$ | 0.8 | EC/DEC (3/7) | 100 | 12 | 72 |
| Example 3 | $Li_{1.26}Fe_{0.11}Ni_{0.11}Mn_{0.52}O_2$ | 2.3 | EC/DEC (3/7) | 96 | 20 | 71 |
| Example 4 | $Li_{1.26}Fe_{0.11}Ni_{0.11}Mn_{0.52}O_2$ | 4.7 | EC/DEC (3/7) | 95 | 24 | 71 |
| Example 5 | $Li_{1.26}Fe_{0.11}Ni_{0.11}Mn_{0.52}O_2$ | 9.7 | EC/DEC (3/7) | 92 | 30 | 70 |
| Example 10 | $Li_{1.26}Fe_{0.11}Ni_{0.11}Mn_{0.52}O_2$ | 0.8 | EC/DEC/TFETFP (28.5/66.5/5) | 100 | 10 | 73 |
| Example 11 | $Li_{1.26}Fe_{0.11}Ni_{0.11}Mn_{0.52}O_2$ | 0.8 | EC/DEC/DFEEC (28.5/66.5/5) | 100 | 8 | 75 |
| Comparative Example 1 | $Li_{1.26}Fe_{0.11}Ni_{0.11}Mn_{0.52}O_2$ | none | EC/DEC (3/7) | 100 | 100 | 58 |
| Comparative Example 2 | $Li_{1.26}Fe_{0.11}Ni_{0.11}Mn_{0.52}O_2$ | lithium metaphosphate of 0.8% by mass was mixed in positive electrode slurry | EC/DEC (3/7) | 70 | 90 | 56 |
| Example 6 | $Li_{1.23}Fe_{0.15}Ni_{0.15}Mn_{0.46}O_2$ | 0.7 | EC/DEC (3/7) | 100 | 20 | 72 |
| Comparative Example 3 | $Li_{1.23}Fe_{0.15}Ni_{0.15}Mn_{0.46}O_2$ | none | EC/DEC (3/7) | 100 | 100 | 60 |
| Example 7 | $Li_{1.2}Ni_{0.18}Mn_{0.54}Co_{0.08}O_2$ | 0.7 | EC/DEC (3/7) | 100 | 50 | 77 |
| Comparative Example 4 | $Li_{1.2}Ni_{0.18}Mn_{0.54}Co_{0.08}O_2$ | none | EC/DEC (3/7) | 100 | 100 | 67 |
| Example 8 | $LiNi_{0.8}Co_{0.15}Al_{0.05}O_2$ | 0.6 | EC/DEC (3/7) | 100 | 68 | 79 |
| Comparative Example 5 | $LiNi_{0.8}Co_{0.15}Al_{0.05}O_2$ | none | EC/DEC (3/7) | 100 | 100 | 68 |
| Example 9 | $LiNi_{0.8}Co_{0.1}Mn_{0.1}O_2$ | 0.5 | EC/DEC (3/7) | 100 | 65 | 80 |
| Comparative Example 6 | $LiNi_{0.8}Co_{0.1}Mn_{0.1}O_2$ | none | EC/DEC (3/7) | 100 | 100 | 70 |
| Example 12 | $Li_{1.26}Fe_{0.11}Ni_{0.11}Mn_{0.52}O_2$ coated with 1% by mass of $Sm_2O_3$ | 0.4 | EC/DEC (3/7) | 100 | 70 | 78 |
| Comparative Example 7 | $Li_{1.26}Fe_{0.11}Ni_{0.11}Mn_{0.52}O_2$ coated with 1% by mass of $Sm_2O_3$ | none | EC/DEC (3/7) | 100 | 100 | 68 |

[1] A relative value where the initial capacity of the lithium ion secondary battery (Comparative Examples 1 to 5) using the positive electrode active substance coated with no lithium metaphosphate was taken to be 100
[2] A relative value where the amount of gases generated in the lithium ion secondary battery (Comparative Examples 1 to 5) using the positive electrode active substance coated with no lithium metaphosphate was taken to be 100

The present invention can have the following aspects.

Further Exemplary Embodiment 1

A positive electrode active substance for a lithium secondary battery, comprising a coated positive electrode active substance wherein a surface of a positive electrode active substance is directly coated with lithium metaphosphate,
wherein the positive electrode active substance comprises at least one selected from:
a lithium transition metal composite oxide comprising at least one transition metal element selected from nickel, cobalt and manganese;
a lithium transition metal composite oxide obtained by replacing a part of a transition metal of the above lithium transition metal oxide by at least one element selected from Sn, Mg, Fe, Ti, Al, Zr, Cr, V, Ga, Ge, Sm, Zn, Cu, Bi, Mo and La, or/and replacing a part of oxygen atoms by S;
a phosphoric acid compound having an olivine structure; and
an active substance obtained by coating a surface of the positive electrode active substance with an oxide containing any of the above elements.

Further Exemplary Embodiment 2

A positive electrode active substance for a lithium secondary battery, comprising a coated positive electrode active substance wherein a surface of a positive electrode active substance is directly coated with lithium metaphosphate, wherein the positive electrode active substance comprises at least one selected from: a lithium transition metal composite oxide represented by one of the following composition formulas:
$Li_{1+a}Ni_xMn_yO_2$ ($0<a\leq0.5$, $0<x<1$, $0<y<1$),
$Li_{1+a}Ni_xMn_yM_zO_2$ ($0<a\leq0.5$, $0<x<1$, $0<y<1$, $0<z<1$, and M is Co or/and Fe),
$LiCo_{1-x}Ni_xO_2$ ($0.01<x<1$),
$LiNi_xCo_yMn_zO_2$ ($x+y+z=1$, $0.01<x$, $0.01<y$, $0.01<z$), and
$LiNi_\beta Co_\gamma Al_\delta O_2$ ($\beta+\gamma+\delta=1$, $0.7\leq\beta<1$, $0<\gamma\leq0.2$, $0<\delta\leq0.1$);
a lithium transition metal composite oxide obtained by replacing a part of at least one element of Ni, Co and Mn of the above lithium transition metal composite oxide by at least one element selected from Sn, Mg, Fe, Ti, Al, Zr, Cr, V, Ga, Ge, Sm, Zn, Cu, Bi, Mo and La, or/and replacing a part of oxygen atoms by S; and
an active substance obtained by coating a surface of the positive electrode active substance with an oxide containing any of the above elements.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

INDUSTRIAL APPLICABILITY

The lithium secondary battery using positive electrode active substance for lithium secondary battery and positive electrode for lithium secondary battery of the present invention can be utilized in every industrial field necessitating power sources, and the industrial fields related to transport, storage and supply of electric energy. Specifically, the battery can be utilized as power sources for mobile devices such as cell phones, laptop computers, tablet computers and portable game machines. The battery can further be utilized as power sources for media for movement and transportation such as electric cars, hybrid cars, electric motorcycles, power-assisted bicycles, and the like. The battery can still further be utilized for backup power sources for household power storage systems, UPSs and the like, power storage facilities to store power generated by solar power generation, wind power generation, and the like.

REFERENCE SIGNS LIST

1 POSITIVE ELECTRODE ACTIVE SUBSTANCE LAYER
1A POSITIVE ELECTRODE CURRENT COLLECTOR
1B POSITIVE ELECTRODE TAB
10 POSITIVE ELECTRODE (CATHODE)
2 NEGATIVE ELECTRODE ACTIVE SUBSTANCE LAYER
2A NEGATIVE ELECTRODE CURRENT COLLECTOR
2B NEGATIVE ELECTRODE TAB
20 NEGATIVE ELECTRODE (ANODE)
3 POROUS SEPARATOR
4 LAMINATE FILM OUTER PACKAGE

The invention claimed is:

1. A positive electrode active substance for a lithium secondary battery, comprising:
a coated positive electrode active substance obtained by directly coating a surface of a positive electrode active substance with lithium metaphosphate,
wherein the lithium metaphosphate is chemically bound to the surface of the positive electrode active substance, and
a mass ratio (A/B) of the lithium metaphosphate (A) with respect to the positive electrode active substance (B) is 0.001 to 0.10.

2. The positive electrode active substance for a lithium secondary battery according to claim 1, wherein the positive electrode active substance comprises a lithium transition metal composite oxide.

3. The positive electrode active substance for a lithium secondary battery according to claim 1, wherein the positive electrode active substance comprises at least one selected from:
a lithium transition metal composite oxide comprising at least one transition metal element selected from nickel, cobalt and manganese;
a lithium transition metal composite oxide obtained by replacing a part of a transition metal of the above lithium transition metal composite oxide by at least one element selected from Sn, Mg, Fe, Ti, Al, Zr, Cr, V, Ga, Ge, Sm, Zn, Cu, Bi, Mo and La, or/and replacing a part of oxygen atoms by S or F;
a phosphoric acid compound having an olivine structure; and
an active substance obtained by coating a surface of the positive electrode active substance with an oxide containing any of the above elements.

4. The positive electrode active substance for a lithium secondary battery according to claim 1, wherein the positive electrode active substance comprises at least one selected from:
a lithium transition metal composite oxide represented by one of the following composition formulas:
$Li_{1+a}Ni_xMn_yO_2$ ($0<a\leq0.5$, $0<x<1$, $0<y<1$),
$Li_{1+a}Ni_xMn_yM_zO_2$ ($0<a\leq0.5$, $0<x<1$, $0<y<1$, $0<z<1$, and M is Co or/and Fe),
$LiCo_{1-x}Ni_xO_2$ ($0.01<x<1$), $LiNi_xCo_yMn_zO_2$ (x+y+z=1, 0.01<x, 0.01<y, 0.01<z), and
$LiNi_\beta Co_\gamma Al_\delta O_2$ ($\beta+\gamma+\delta=1$, $0.7\leq\beta<1$, $0<\gamma\leq0.2$, $0\leq 0.1$);
a lithium transition metal composite oxide obtained by replacing a part of at least one element of Ni, Co and Mn of the above lithium transition metal composite oxide by at least one element selected from Sn, Mg, Fe, Ti, Al, Zr, Cr, V, Ga, Ge, Sm, Zn, Cu, Bi, Mo and La, or/and replacing a part of oxygen atoms by S or F; and
an active substance obtained by coating a surface of the positive electrode active substance with an oxide containing any of the above elements.

5. A positive electrode for a lithium secondary battery, comprising: a positive electrode current collector; and a positive electrode active substance layer comprising the positive electrode active substance for a lithium secondary battery according to claim 1 on the positive electrode current collector.

6. A lithium secondary battery, comprising: the positive electrode for a lithium secondary battery according to claim 5; a negative electrode comprising a negative electrode active substance; a nonaqueous electrolyte solution; and an outer package accommodating these.

7. The lithium secondary battery according to claim 6, wherein the negative electrode comprises at least one of simple silicon, silicon oxide and carbon.

8. The lithium secondary battery according to claim 6, wherein the nonaqueous electrolyte comprises at least one of a chain carbonate-based solvent and a cyclic carbonate-based solvent.

9. A method for producing the positive electrode active substance for a lithium secondary battery according to claim 1, the method comprising:
soaking the positive electrode active substance in a coating-forming liquid comprising lithium metaphosphate;
separating and removing the coating-forming liquid; and
thereafter washing the positive electrode active substance with a solvent capable of dissolving lithium metaphosphate not bound to the surface of the positive electrode active substance.

10. A method for producing a lithium secondary battery, comprising:
forming a coated positive electrode active substance by the method according to claim 9;
forming a positive electrode by using the coated positive electrode active substance;
forming a negative electrode; and
accommodating the positive electrode, the negative electrode and an electrolyte solution in an outer package.

11. The positive electrode active substance for a lithium secondary battery according to claim 1, wherein a phosphorus atom (P) of the residue part of metaphosphoric acid of the lithium metaphosphate and a metal atom of the positive electrode active substance are bound through an oxygen atom (O).

12. The method for producing the positive electrode active substance for a lithium secondary battery according to claim 9, wherein in the soaking, the positive electrode active substance is soaked at 40 to 100° C. to react and bind the lithium metaphosphate with the positive electrode active substance.

13. A positive electrode active substance for a lithium secondary battery, comprising a coated positive electrode active substance wherein a surface of a positive electrode active substance is directly coated with lithium metaphosphate,
wherein the positive electrode active substance comprises at least one selected from:
a lithium transition metal composite oxide comprising at least one transition metal element selected from nickel, cobalt and manganese;
a lithium transition metal composite oxide obtained by replacing a part of a transition metal of the above lithium transition metal composite oxide by at least one element selected from Sn, Mg, Fe, Ti, Al, Zr, Cr, V, Ga, Ge, Sm, Zn, Cu, Bi, Mo and La, or/and replacing a part of oxygen atoms by S;
a phosphoric acid compound having an olivine structure;
an active substance obtained by coating a surface of the positive electrode active substance with an oxide containing any of the above elements;
the lithium metaphosphate is chemically bound to the surface of the positive electrode active substance; and
a mass ratio (A/B) of the lithium metaphosphate (A) with respect to the positive electrode active substance (B) is 0.001 to 0.10.

14. The positive electrode active substance for a lithium secondary battery according to claim 13, wherein a phosphorus atom (P) of the residue part of metaphosphoric acid of the lithium metaphosphate and a metal atom of the positive electrode active substance are bound through an oxygen atom (O).

15. A positive electrode for a lithium secondary battery, comprising:
a positive electrode current collector; and
a positive electrode active substance layer comprising the positive electrode active substance for a lithium secondary battery according to claim 13 on the positive electrode current collector.

16. A lithium secondary battery, comprising:
the positive electrode for a lithium secondary battery according to claim 15;
a negative electrode comprising a negative electrode active substance;
a nonaqueous electrolyte solution; and
an outer package accommodating these.

17. A positive electrode active substance for a lithium secondary battery, comprising a coated positive electrode active substance wherein a surface of a positive electrode active substance is directly coated with lithium metaphosphate,
wherein the positive electrode active substance comprises at least one selected from:
a lithium transition metal composite oxide represented by one of the following composition formulas:
$Li_{1+a}Ni_xMn_yO_2$ ($0<a\leq 0.5$, $0<x<1$, $0<y<1$),
$Li_{1+a}Ni_xMn_yM_zO_2$ ($0<a\leq 0.5$, $0<x<1$, $0<y<1$, $0<z<1$, and M is Co or/and Fe),
$LiCo_{1-x}Ni_xO_2$ ($0.01<x<1$),
$LiNi_xCo_yMn_zO_2$ (x+y+z=1, 0.01<x, 0.01<y, 0.01<z), and
$LiNi_\beta Co_\gamma Al_\delta O_2$ ($\beta+\gamma+\delta=1$, $0.7\leq\beta<1$, $0<\gamma\leq 0.2$, $0<\delta\leq 0.1$);
a lithium transition metal composite oxide obtained by replacing a part of at least one element of Ni, Co and Mn of the above lithium transition metal composite oxide by at least one element selected from Sn, Mg, Fe, Ti, Al, Zr, Cr, V, Ga, Ge, Sm, Zn, Cu, Bi, Mo and La, or/and replacing a part of oxygen atoms by S;
an active substance obtained by coating a surface of the positive electrode active substance with an oxide containing any of the above elements;
the lithium metaphosphate is chemically bound to the surface of the positive electrode active substance; and
a mass ratio (A/B) of the lithium metaphosphate (A) with respect to the positive electrode active substance (B) is 0.001 to 0.10.

18. The positive electrode active substance for a lithium secondary battery according to claim 17, wherein a phosphorus atom (P) of the residue part of metaphosphoric acid of the lithium metaphosphate and a metal atom of the positive electrode active substance are bound through an oxygen atom (O).

19. A positive electrode for a lithium secondary battery, comprising:
- a positive electrode current collector; and
- a positive electrode active substance layer comprising the positive electrode active substance for a lithium secondary battery according to claim 17 on the positive electrode current collector.

20. A lithium secondary battery, comprising:
- the positive electrode for a lithium secondary battery according to claim 19;
- a negative electrode comprising a negative electrode active substance;
- a nonaqueous electrolyte solution; and
- an outer package accommodating these.

* * * * *

UNITED STATES PATENT AND TRADEMARK OFFICE
CERTIFICATE OF CORRECTION

PATENT NO. : 10,833,369 B2
APPLICATION NO. : 15/778905
DATED : November 10, 2020
INVENTOR(S) : Katsumi Maeda and Sadanori Hattori It is certified that error appears in the above-identified patent and that said Letters Patent is hereby corrected as shown below:

In the Specification

Column 4, Description of Embodiments, Line 50; Delete "$0.70 \leq \beta < 1$," and insert --$0.7 \leq \beta < 1$,-- therefor Column 4, Description of Embodiments, Line 50; Delete "$0 < \delta \leq 80.1$)," and insert --$0 < \delta \leq 0.1$),-- therefor Column 12, Description of Embodiments, Lines 19-20; Delete "8-valerolactone" and insert --δ-valerolactone-- therefor In the Claims Column 25, Line 2; In Claim 4, delete "$0 \leq 0.1$);" and insert --$0 < \delta \leq 0.1$);-- therefor Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*